(No Model.)
J. GAMBETTA.
AXLE NUT.
No. 485,497. Patented Nov. 1, 1892.
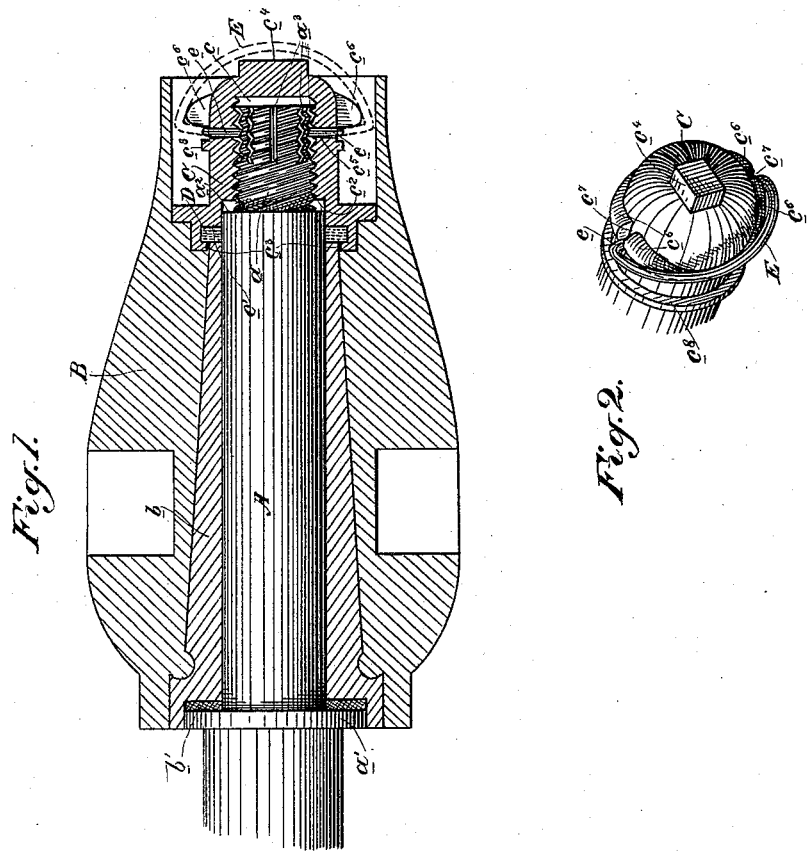
Witnesses:
Inventor,
John Gambetta
By Dewey & Co
Attys

UNITED STATES PATENT OFFICE.

JOHN GAMBETTA, OF STOCKTON, CALIFORNIA.

AXLE-NUT.

SPECIFICATION forming part of Letters Patent No. 485,497, dated November 1, 1892.

Application filed February 19, 1892. Serial No. 422,121. (No model.)

*To all whom it may concern:*

Be it known that I, JOHN GAMBETTA, a citizen of the United States, residing at Stockton, San Joaquin county, State of California, have invented an Improvement in Axle-Nuts; and I hereby declare the following to be a full, clear, and exact description of the same.

My invention relates to the class of nuts which fit upon the threaded end of the axle-spindle and hold the wheel thereon.

My invention consists in the peculiar construction of the interior of the nut and in the novel means for locking it on the spindle hereinafter fully described, and specifically pointed out in the claims.

The objects of my invention are to take up the wear in the hub-box and keep the wheel snug on the axle, to securely confine the nut-washer so that it will not fall out when the nut is removed, and to lock and hold the nut in place on the spindle at any point to which it may be set up, whereby it is prevented from either turning forward or back.

Referring to the accompanying drawings for a more complete explanation of my invention, Figure 1 is a section of my axle-nut. Fig. 2 is a perspective view of the outer end of the nut.

A is the axle-spindle having the threaded tip $a$ and the inner collar or flange $a'$.

B is the wheel-hub having a box $b$. The inner end of this box bears, as usual, against the collar or flange $a'$, with an intervening washer $b'$.

C is my nut. Its interior is formed with the threaded socket $c$ and the main shoulder $c'$, which receives the washer D. In the ordinary nuts the threaded socket joins the shoulder $c'$, and this shoulder overlaps the small shoulder $a^2$ where the tip $a$ joins the spindle. It results that the nut cannot be screwed upon the spindle-tip any farther than said shoulder $a^2$, because its own shoulder $c'$, coming in contact with it, limits it. Therefore when any wear occurs, as it always does on the inner end of the box $b$, the shoulder $c'$ of the nut cannot follow up the outer end of the box to cause its washer to bear upon it, and the wheel becomes loose. This wear is usually taken up by inserting more washers or a larger washer at $b'$ to force the wheel-hub outwardly and give the nut-washer a bearing against the outer end of the box. My nut overcomes this difficulty by a construction which enables it to take up this wear by following up the hub-box. Accordingly its main shoulder $c'$ is constructed to freely pass over the spindle-tip shoulder $a^2$ and fit upon the spindle beyond the tip. A second shoulder $c^2$ is formed in the nut and lies between the outer shoulder and the threaded socket, the latter terminating at said intervening shoulder. This shoulder $c^2$ is deep enough to allow for sufficient play before reaching shoulder $a^2$ to provide for taking up any usual amount of wear. It will be seen, therefore, that as wear takes place and the hub-box recedes the nut can follow it up and keep its washer D constantly bearing on the outer end of the box. This can continue up to the contact of the intervening nut-shoulder $c^2$ with the tip-shoulder $a^2$. The nut is therefore never jammed close on the spindle-tip and can be readily removed.

In the ordinary nuts the shoulder $c'$, forming the washer-seat, opens directly out from the nut, and this allows the washer to fall out nearly every time the nut is removed. To overcome this difficulty, I provide the inner edge of the nut with an inwardly-extending lip $c^3$. This confines the washer, which, being jammed to its seat, bears behind the lip and it cannot fall out.

Now in order to hold the nut on the axle and prevent it from turning either backward or forward (an object particularly to be desired with my nut, as it is not jammed to its seat) I may have any suitable lock. I prefer the following: The outer end of the nut-surface is made somewhat spherical and terminates in a small square portion $c^4$ to furnish a wrench-hold, if required. In the nut at opposite sides are made holes $c^5$, extending through it into its threaded socket. E is a bail-shaped catch with bent ends $e$. This catch is formed of wire. It encircles half of the nut and its bent ends enter the holes $c^5$ and extend down into and engage longitudinal grooves $a^3$ made in the surface of the threaded tip $a$. These grooves are sufficient in number to insure the engagement of the bent ends $e$ when the nut is set up to any position. While this engagement lasts the nut cannot turn in either direction. The catch E has sufficient spring to hold it in place and it will not jar or drop out. To remove the catch, I have formed or secured on the surface of the nut the inclined planes or cams $c^6$. These begin with their highest portion just to one side of the holes $c^5$, and they thence curve away from the outer end of the nut and gradually diminish in height to the level of the nut-surface. There are four of these cams in pairs on opposite sides, the members of each pair commencing on each side of the hole $c^5$, and thence following the course described. Where the members of each pair meet is a small notch $c^7$. Now when the catch E is in place it can be grasped by its middle and swung outwardly like a bail toward the end of the nut, turning on its ends $e$. In this movement it comes in contact with and rises upon the cams $c^6$, and as this rise continues its ends $e$ are drawn outwardly from their engagement with the grooves $a^3$ in the spindle-tip, thereby freeing the nut. The catch finally swings over the end of the nut to a position at right angles to its first position, and then it bears in the notch $c^7$ in a state of rest. When it is swung back again, its ends $e$ return to their engagement and the nut is locked. The object of having four cams $c^6$ is for convenience in fitting the catch E to either side of the nut which may be uppermost and operating it from that side.

Small shoulders $c^8$ are formed on the nut-surface inside of the catch E, which serve to limit the catch in that direction and prevent it from coming in contact with the inner portion of the nut.

Having thus described my invention, what I claim as new, and desire to secure by Letters Patent, is—

1. An axle-nut having the interior threaded socket to receive the axle-tip, the main shoulder forming the washer-seat and fitting over the spindle, and the intervening shoulder $c^2$, with which the threaded socket terminates, substantially as herein described.

2. In combination with the axle-spindle having the threaded tip and the wheel-hub having the box, the nut formed with a threaded socket receiving the axle-tip, the main shoulder fitting over the axle-spindle and forming the seat for the washer which bears against the hub-box, and the intervening shoulder $c^2$, in which the threaded socket terminates, substantially as herein described.

3. In combination with the axle-spindle having the threaded tip and the wheel-hub having the box, the nut formed with a threaded socket receiving the axle-tip, the main shoulder fitting over the axle-spindle and forming the seat for the washer which bears against the hub-box, and the intervening shoulder $c^2$, in which the threaded socket terminates, and a lock to hold the nut on the spindle-tip and keep it from turning, substantially as herein described.

4. An axle-nut having the washer-seat and formed with an inwardly-extending lip on its inner end to confine the washer, substantially as herein described.

5. The combination of a nut having the holes opening into its interior socket, a threaded piece on which the nut is seated and having grooves, and a bail-shaped catch on the nut, having bent ends extending through the holes in the nut and engaging the grooves in the threaded piece, substantially as herein described.

6. The combination of a nut having the holes opening into its interior socket, a threaded piece on which the nut is seated and having grooves, a bail-shaped catch on the nut having bent ends extending through the holes in the nut and engaging the grooves in the threaded piece, and the inclined cams on the nut-surface over which the catch swings, whereby its ends are withdrawn from their engagement, substantially as herein described.

7. The combination of a nut having the holes opening into its interior socket, a threaded piece on which the nut is seated and having grooves, a bail-shaped catch on the nut, having bent ends extending through the holes in the nut and engaging the grooves in the threaded piece, and the inclined cams on the nut-surface over which the catch swings, whereby its ends are withdrawn from their engagement, said cams being arranged in opposing pairs, substantially as herein described.

8. The combination of a nut having the holes opening into its interior socket, a threaded piece on which the nut is seated and having grooves, a bail-shaped catch on the nut, having bent ends extending through the holes in the nut and engaging the grooves in the threaded piece, and the inclined cams on the nut-surface over which the catch swings, whereby its ends are withdrawn from their engagement, said cams being arranged in opposing pairs with an intervening notch to hold said catch when swung outwardly, substantially as herein described.

9. The axle-nut having the interior threaded socket, the main washer-seat shoulder, and the intervening shoulder with which the threaded socket terminates, in combination with the locking device consisting of the swinging bail-shaped catch with bent ends passing through the nut and engaging the spindle-tip, substantially as herein described.

10. The axle-nut having the interior threaded socket, the main washer-seat shoulder, and the intervening shoulder with which the threaded socket terminates, in combination with the locking device consisting of the swinging bail-shaped catch with bent ends passing through the nut and engaging the spindle-tip and the inclined cams on the nut for relieving the ends of the catch from their engagement, substantially as herein described.

In witness whereof I have hereunto set my hand.

JOHN GAMBETTA.

Witnesses:
ARTHUR L. LEVINSKY,
C. O. McCORMICK.